(12) United States Patent
Calabrò et al.

(10) Patent No.: US 11,558,113 B2
(45) Date of Patent: Jan. 17, 2023

(54) AUTOMATIC MEASUREMENT OF THE NOISE PERFORMANCE OF A TRANSPONDER

(71) Applicant: Xieon Networks S.A.R.L., Luxembourg (LU)

(72) Inventors: Stefano Calabrò, Munich (DE); Lutz Rapp, Deisenhofen (DE); Bernhard Spinnler, Oberhaching (DE)

(73) Assignee: XEION NETWORKS S.A.R.L., Luxembourg (LU)

( * ) Notice: Subject to any disclaimer, the term of this patent is extended or adjusted under 35 U.S.C. 154(b) by 0 days.

(21) Appl. No.: 17/040,002

(22) PCT Filed: Feb. 5, 2019

(86) PCT No.: PCT/EP2019/052796
§ 371 (c)(1),
(2) Date: Sep. 21, 2020

(87) PCT Pub. No.: WO2019/179688
PCT Pub. Date: Sep. 26, 2019

(65) Prior Publication Data
US 2021/0021338 A1 Jan. 21, 2021

(30) Foreign Application Priority Data
Mar. 21, 2018 (EP) .................................... 18163097

(51) Int. Cl.
*H04B 10/07* (2013.01)
*H04B 17/00* (2015.01)
(Continued)

(52) U.S. Cl.
CPC ....... *H04B 10/07953* (2013.01); *H04B 10/40* (2013.01); *H04B 10/50* (2013.01); *H04B 10/61* (2013.01)

(58) Field of Classification Search
CPC .. H04B 10/07953; H04B 10/40; H04B 10/50; H04B 10/61
See application file for complete search history.

(56) References Cited

U.S. PATENT DOCUMENTS 6,580,531 B1 * 6/2003 Swanson .............. H04B 10/504
398/5
10,211,917 B1 * 2/2019 Wang ................... H04B 10/032
(Continued)

FOREIGN PATENT DOCUMENTS

EP 3264635 A1 1/2018

OTHER PUBLICATIONS

International Search Report issued in connection with PCT Application No. PCT/EP2019/052796 dated May 3, 2019.
(Continued)

*Primary Examiner* — David C Payne
*Assistant Examiner* — Pranesh K Barua (57) ABSTRACT

Disclosed herein is a transponder comprising a transmitter and a receiver. The transponder further comprises a receiver input amplifier, a bypass line, and a control unit configured for determining the performance of the transponder in relation to an OSNR related parameter, by controlling the transponder to generate a noise signal to be received by the receiver. The receiver input amplifier is operated to thereby cause ASE in the receiver input amplifier to facilitate the determination. A test signal is generated at the transmitter Said noise signal and said test signal, and/or one or more respective replicas thereof, are superimposed to form a combined signal to be received by said receiver to further facilitate determination of said performance related parameter based on said combined signal, wherein for generating said combined signal, said test signal is fed from the transmitter to the receiver by means of said bypass line.

34 Claims, 5 Drawing Sheets

(51) Int. Cl.
  *H04B 10/079* (2013.01)
  *H04B 10/40* (2013.01)
  *H04B 10/50* (2013.01)
  *H04B 10/61* (2013.01)

(56) References Cited

U.S. PATENT DOCUMENTS

2012/0063772 A1* 3/2012 Dahan .............. H04B 10/07953
  398/26
2015/0155935 A1* 6/2015 Oda ................. H04B 10/07953
  398/26
2017/0142503 A1 5/2017 Takei

OTHER PUBLICATIONS

Wang Qiang et al. "Accurate model to predict performance of coherent optical transponder," Proceedings of SPIE, SPIE, vol. 10561, Jan. 29, 2018.

* cited by examiner

AUTOMATIC MEASUREMENT OF THE NOISE PERFORMANCE OF A TRANSPONDER

This application is a 35 U.S.C. 371 notional stage filing of International Application No. PCT/EP2019/052796, filed on Feb. 5, 2019, which claims priority to European Patent Application No. 18163097.1, filed on Mar. 21, 2018. The entire contents of these applications are incorporated herein by reference.

FIELD OF THE INVENTION

The present invention is in the field of optical data transmission. In particular, the present invention relates to a transponder permitting to determine its noise performance, as well as a corresponding method. The technique is in particular suitable for the characterization of transponders equipped with pluggable optical modules, such as small-form factor pluggable (SFP and SFP+) modules, C-form factor pluggable (CFP) modules in various variants (CFPn with n=2, 4, 8, . . . ), and to Gigabit small form factor pluggable (XFP) modules.

BACKGROUND OF THE INVENTION

Efficient deployment of optical transponders in optical networks requires accurate performance modeling. In particular, precise information about transponder performance allows saving intermediate repeaters and thus helps to keep costs at a low level. Furthermore, precise information about the performance of already installed connections allows to select routes for new connections in such a way that performance is well balanced over the connections.

A key parameter for network planning is the residual margin which provides information about the extent of performance degradation that can be tolerated before the link breaks down. Typical calculations of the residual margin rely upon the back-to-back performance, commonly expressed in terms of the required optical signal-to-noise ratio (OSNR) to achieve the target error rate in a back-to-back configuration, i.e. without a substantial length of fiber between the transmitter and receiver. The required OSNR varies from transponder sample to transponder sample, but in most cases only typical values are known. Therefore, a worst-case value of the required OSNR, which guarantees error free operation for all transponder samples, is currently used in practical applications. However, this leads to conservative planning involving too many repeaters and causing increased cost. This situation could in principle be improved if the back-to-back performance of the actually used transponder sample was known. Furthermore, a method for characterizing the installed transponders could help to identify the root cause of a failure.

As of today, almost all transponders added to high-performance optical networks covering long distances are based on coherent detection and polarization multiplexing. Furthermore, there is a trend to deploy pluggable modules that may be plugged into transponder cards on demand. In an open ecosystem, a network operator might mix pluggable modules from different suppliers and plug them into the transponder card of the system supplier. In this scenario, exact characterization of the card during manufacturing of the card is no longer an option.

Moreover, measuring transponder performance at installation time by making use of external measurement equipment and menu interactions is not a practical solution, both for cost reasons and in view of the risk of wrong measurement results when carried out improperly by personnel in the field.

Another possible approach, which might dispense with the use of external equipment, would be to emulate variable noise levels by adding noise terms in the digital domain, i.e. in the digital signal processor (DSP) used for signal generation and detection. However, such DSPs are manufactured by a small number of specialized companies designing chips for the entire market. Thus, customization is almost impossible from a cost point of view and performance measurements are not possible if the addition of digital noise has not been implemented in the DSP, as is currently the case with commercially available DSPs. Furthermore, the characteristics of "artificial" digital noise are different from "real" analog noise such as thermal noise and noise induced by amplified spontaneous emission (ASE).

SUMMARY OF THE INVENTION

The problem underlying the invention is to provide a transponder and a method allowing for improved performance modelling of transponders in optical networks. This problem is solved by for example a transponder and a method according to the below claims.

The present invention provides a transponder, comprising a transmitter for generating and transmitting an optical signal and a receiver for receiving optical signals, wherein said receiver comprises a receiver-photodetector-assembly for transforming a received optical signal into an electrical signal, and a receiver input amplifier at the receiver's input suitable for amplifying incoming optical signals to be received by said receiver, wherein said input amplifier comprises an optical gain medium.

The transponder further comprises a bypass line configured to selectively feed an optical signal from said transmitter to the receiver, and a control unit configured for determining the performance of the transponder, and in particular the receiver thereof, in relation to an OSNR related parameter, by controlling the transponder to generate a noise signal to be received by the receiver, by operating the receiver input amplifier to thereby cause ASE in the receiver input amplifier and to determine a noise intensity value representing the intensity of the noise signal, generate a test signal at the transmitter and to determine a signal intensity value representing the test signal intensity, wherein the ratio of the signal intensity value and the noise intensity value resembles said OSNR related parameter, and superimposing said noise signal and said test signal, or replicas thereof, to form a combined signal to be received by said receiver and determining said performance related parameter based on said combined signal, wherein for generating said combined signal, said test signal is fed from the transmitter to the receiver by means of said bypass line.

Herein, the term "OSNR related value" could refer to an actual OSNR value, but the invention is not limited to this. Instead, as will be explained below, the "OSNR related value" could for example resemble the actual OSNR value up to an unknown factor, or in other words, resemble a "relative OSNR value", which would be one example of an "OSNR related value".

The present invention exploits the fact that some pluggable transponder modules, in particular those making use of integrated optics, employ an optical gain medium, such as an EDFA, to compensate for losses on the optical chip and to achieve the required output power as well as the optical power required for signal detection. The present invention makes use of such optical gain mediums at the receive side for generating variable OSNR values. While currently, an EDFA would be the typical choice for providing the optical gain, in principle semiconductor optical amplifiers could likewise be used for this purpose.

The setup allows for automatic performance characterization of the complete transponder after commissioning in the field, without having to employ external equipment or any manual effort. Moreover, the performance characterization can be based on the actual combination of transponder card and pluggable module.

Moreover, the transponder of the invention allows for a performance characterization that is advantageous over the scenario considered above where variable noise levels are emulated by adding noise terms in the digital domain. First of all, by avoiding this emulation, ordinary, commercially available DSP chips can be used. Moreover, emulated noise could either be added on the transmit side, i.e. before the electrical signals are provided to the transmitter, or it could be added after receiving the incoming optical signals. In both cases, the digital noise has different characteristics than "real" analog noise coming from the transmission line. When adding the digital noise after receiving the input signal, the noise is—in contrast to the "real" noise—not filtered by the receiver. On the other hand, when already introducing the digital noise to the electrical signals in front of the transmitter, the noise is also altered by the transmitter, whereas the "real" analog noise generated on the optical line is not affected by the transmitter. This drawback is avoided by the transponder of the invention.

In a preferred embodiment, the receiver of the transponder is a coherent receiver, said coherent receiver comprising a local oscillator light source, wherein optical signals to be received are combined with the local oscillator light on the receiver-photodetector-assembly. Herein, said receiver-photodetector-assembly is preferably a photodiode, or a pair of balanced photodiodes.

In a preferred embodiment, one or both of said signal intensity value and noise intensity value are determined using the receiver-photodetector-assembly.

In an alternative embodiment, the transponder is configured to determine the noise intensity value by means of a photosensitive element arranged between the receiver input amplifier and the receiver-photodetector-assembly.

In a preferred embodiment, said transponder is configured to determine the signal intensity value by means of a photosensitive element arranged between the transmitter and the receiver-photodetector-assembly, and in particular arranged within said bypass line.

For determining the optical noise, i.e. the denominator of the OSNR, the power within a predetermined frequency range with a width of typically 0.1 nm has to be considered. Accordingly, in a preferred embodiment, the transponder comprises a bandpass filter for filtering said noise signal prior to determining said noise intensity value. In preferred embodiments, the bandpass filter is a tunable bandpass filter permitting to adjust the frequency of the passband to the frequency of the test signal.

In an alternative embodiment, the bandpass filter is a static filter having a fixed passband, and the control unit is configured to compute the noise intensity value at the frequency of a test signal that is outside of said passband based on information on how the ASE power generated in said receiver amplifier, at a given operating state thereof (such as at a given pumping power), changes with frequency. Using a static filter instead of a tunable filter reduces costs. This however implies that the noise intensity value is measured at the "wrong frequency". Accounting for how the ASE power generated in the receiver amplifier, at a given amplifier operating state, changes with frequency allows for estimating what the noise intensity value at the "correct frequency" would be. The adjective tunable refers to the fact that the wavelength characteristics of a device can be altered in a controlled manner. With respect to a laser, this means that the center frequency or center wavelength of the emitted lightwave can be changed by adapting a control signal. Applied to a bandpass filter, it is indicated that the passband of the filter can be shifted in wavelength or frequency.

In one embodiment, the control unit is configured to retrieve said information about the change of the ASE power with frequency from a lookup table or from a calculation using a prestored function.

In an alternative embodiment, where the receiver is a coherent receiver, said control unit may be configured to obtain said information regarding the change of ASE power frequency by controlling the transponder to measure a first intensity of the noise signal using the receiver-photodetector-assembly with the local oscillator tuned to said passband frequency and a second intensity of the noise signal with a local oscillator tuned to the frequency of the test signal.

In a preferred embodiment, the transponder is a part of a pluggable module that can be plugged into a card for use in a network element.

In a preferred embodiment, said performance parameter is one of a bit error rate, BER, and an error vector magnitude, EVM.

In a preferred embodiment, said control unit is further configured for carrying out the determination of the performance of the transponder in relation to said OSNR related parameter for a plurality of different noise signal intensities, and to determine, based on the result of this determination, one or both of a minimum OSNR value, at which said performance parameter reaches a predetermined performance threshold, and an OSNR margin representing a tolerable decrease in OSNR as compared to a given OSNR and to a given performance parameter, until a predetermined performance threshold is reached.

Note that the OSNR is typically given in logarithmic values, such as dB. Accordingly, for defining the OSNR margin, it is not necessary to know absolute OSNR values, but knowing relative OSNR values (i.e. up to an unknown factor) is sufficient. In a preferred embodiment, said control unit is configured for determining said minimum OSNR value or said OSNR margin based on said result of said determination of the performance of the transponder in relation to said OSNR related parameter and on information about the optical link to which said transponder is connected, thereby at least approximately accounting for sources of signal degradation other than ASE upon transmission on said optical link. Namely, while the transponder of the invention allows for determining a relationship between a performance value, such as BER, and an OSNR related value in a back-to-back measurement, under actual operation of the transponder for receiving optical signals via the corresponding optical link, there will be additional sources of signal degradation associated with the optical link that will likewise have an impact on the BER. As is explained in more detail below, these additional sources of signal degradation can be treated on the same footing as actual optical noise, and can be taken mathematically into account by introducing an auxiliary noise power value that comprises contributions of ASE as well as link related "equivalent noise power contributions" representing other sources of signal degradation upon transmission on the optical link. The "equivalent noise power contributions" will depend at least partially on the signal intensity. Accordingly, knowing both, the relationship between BER and OSNR on the one hand, as well as the power of optical signals on the corresponding link, it is possible to make a more precise prediction of the aforementioned minimum OSNR value or OSNR margin also accounting for other sources of signal degradation than ASE upon transmission on said link. The information about the optical link may be provided by the network management system to the transponder.

Signal distortions are typically induced across the complete transmission link. Nonlinear fiber effects are an important source of signal distortions and alter the waveform of the transmitted signals mainly in high power regions of the fiber, i.e. in the fiber regions after the optical amplifiers. The extent of such distortions depends on the optical power and on the fiber characteristics, in particular on parameters like mode field diameter, nonlinear fiber parameter, group-velocity dispersion, and attenuation coefficient. The more of the parameters and the better they are known, the more accurately the equivalent noise power can be calculated. Strictly speaking, the extent of nonlinear fiber effects depends on the distribution of the optical power versus wavelength. However, when using modern transmitters based on phase modulation or combined phase and amplitude modulation the wavelength dependence is not as strong as it has been for intensity modulation. Thus, acceptable results can be obtained by just considering the total optical power in the fiber which would hence be an example of said "information about the optical link". Typical amplifiers are equipped with monitors that allow to measure the power at the output of the amplifier that is—slightly attenuated—launched into the transmission fiber. This information can for example be provided to the transponder via a network management system. Fiber parameters may also be provided to the transponder via this management system that has been fed with data from a planning tool. All of the above resemble examples of the aforementioned "information about the optical link" which allows for at least approximately accounting for sources of signal degradation other than ASE upon transmission on said optical link.

Clearly, there are different ways to mathematically implement the determination of the OSNR value or OSNR margin that can be carried out by the control unit, and the invention is not limited to any specific one of them.

Herein, the noise signal intensities may be varied by varying the pump power of the receiver input amplifier.

In a preferred embodiment, the transponder comprises an optical switch, or a splitter in combination with variable optical attenuators to selectively feed an optical signal, from the transmitter, to the bypass line.

In a preferred embodiment, the transponder is a dual polarization transponder configured for transmitting and receiving polarization multiplexed quaternary phase shift keying (QPSK) or quadrature amplitude modulation (QAM) signals, wherein said transmitter comprises two "in-phase and quadrature" (IQ) modulators, each connected to a polarization beam combiner, and wherein said receiver comprises two IQ receiver units, each connected to a polarization beam splitter.

Herein, said bypass line is preferably connected with the output of only one of said IQ modulators and is connected to both of the two IQ receiver units.

In a preferred embodiment, the control unit is configured to automatically carry out said determining of the performance of the transponder in relation to an OSNR related parameter upon first installation of the transponder in the field, or upon a trigger signal received from a network management system.

A further aspect of the invention relates to a method of measuring the performance of a transponder, said transponder comprising a transmitter for generating and transmitting an optical signal and a receiver for receiving optical signals, wherein said receiver comprises—a receiver-photodetector-assembly for transforming a received optical signal into an electrical signal, and a receiver input amplifier at the receiver's input suitable for amplifying incoming optical signals to be received by said receiver, wherein said input amplifier comprises an optical gain medium.

The transponder to which the method relates further comprises a bypass line configured to selectively feed an optical signal from said transmitter to the receiver.

The method comprises the steps of generating a noise signal to be received by the receiver, by operating the receiver input amplifier to thereby cause ASE in the receiver input amplifier and determining a noise intensity value representing the intensity of the noise signal, generating a test signal at the transmitter and determining a signal intensity value representing the test signal intensity, wherein the ratio of the signal intensity value and the noise intensify value resembles said OSNR related parameter, and superimposing said noise signal and said test signal, or replicas thereof, to form a combined signal to be received by said receiver and determining said performance related parameter based on said combined signal, wherein for generating said combined signal, said test signal is fed from the transmitter to the receiver by means of said bypass line.

In a preferred embodiment, the receiver is a coherent receiver, said coherent receiver comprising a local oscillator light source, wherein optical signals to be received are combined with the local oscillator light on the receiver-photodetector-assembly. Said receiver-photodetector-assembly may be a photodiode, or a pair of balanced photodiodes.

In a preferred embodiment, one or both of said signal intensify value and noise intensify value are determined using the receiver-photodetector-assembly.

In a preferred embodiment, said noise intensify value is determined by means of a photosensitive element arranged between the receiver input amplifier and the receiver-photodetector-assembly.

Preferably, said signal intensity value is determined by means of a photosensitive element arranged between the transmitter and the receiver-photodetector-assembly, and in particular arranged within said bypass line.

In a preferred embodiment, said noise signal is filtered using a bandpass filter prior to determining said noise intensity value, wherein said bandpass filter is preferably a tunable bandpass filter, and the method comprises a step of adjusting the frequency of the passband to the frequency of the test signal. As an alternative, said bandpass filter may be a static filter having a fixed passband, and the method may comprise a step of computing the noise intensity value at the frequency of a test signal that is outside of said passband based on information on how the ASE power generated in said receiver amplifier, at a given operating state thereof (such as a given pump power), changes with frequency. Herein, said information may be retrieved from a lookup table or from a calculation using a prestored function.

In a preferred embodiment, said information is obtained by measuring a first intensity of the noise signal using the receiver-photodetector-assembly with the local oscillator tuned to said passband frequency and a second intensity of the noise signal with the local oscillator tuned to the frequency of the test signal.

In various embodiments of the method of the invention, the transponder may be part of a pluggable module that can be plugged into a card for use in a network element.

In a preferred embodiment, said performance parameter is one of a bit error rate, BER, and an error vector magnitude, EVM.

In a preferred embodiment, the performance of the transponder in relation to the OSNR related parameter is determined for a plurality of different noise signal intensities, and based on the result of this determination, one or both of
- a minimum OSNR value, at which said performance parameter reaches a predetermined performance threshold, and
- an OSNR margin representing a tolerable decrease in OSNR as compared to a given OSNR and to a given performance parameter, until a predetermined performance threshold is reached, is determined.

In a preferred embodiment, said step of determining said minimum OSNR value or said OSNR margin is carried out based on said result of said determination of the performance of the transponder in relation to said OSNR related parameter and on information about the optical link to which said transponder is connected, thereby at least approximately accounting for sources of signal degradation other than ASE upon transmission on said optical link.

In a preferred embodiment, the noise signal intensities are varied by varying the operation state of the receiver input amplifier, and in particular a pump power thereof.

In some embodiments, said OSNR margin is an absolute OSNR value. In alternative embodiments, said OSNR margin may be a relative OSNR value with respect to said given OSNR corresponding to said given performance parameter.

In preferred embodiments, the performance of the transponder in relation to an OSNR related parameter is carried out automatically upon first installation of the transponder in the field, or upon a trigger signal received from a network management system.

In digital communication, signal quality is typically quantified by referring to the number of bit errors, i.e. the number of received bits that have been altered due to noise, interference, distortion or bit synchronization errors. To be strictly accurate, one must distinguish between two parameters, namely the "bit error rate" indicating the number of bit errors per unit time and the "bit error ratio" quantifying the share of altered bits among the bits transmitted during a studied time interval. But in general language, no clear distinction is made between these two parameters and the term "bit error rate" is also used for the bit error ratio. In this document, the term "bit error rate" will be used for any kind of quality parameter based on the number of bits altered during transmission. Thus, the term "bit error rate" will also include the bit error ratio.

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 1:
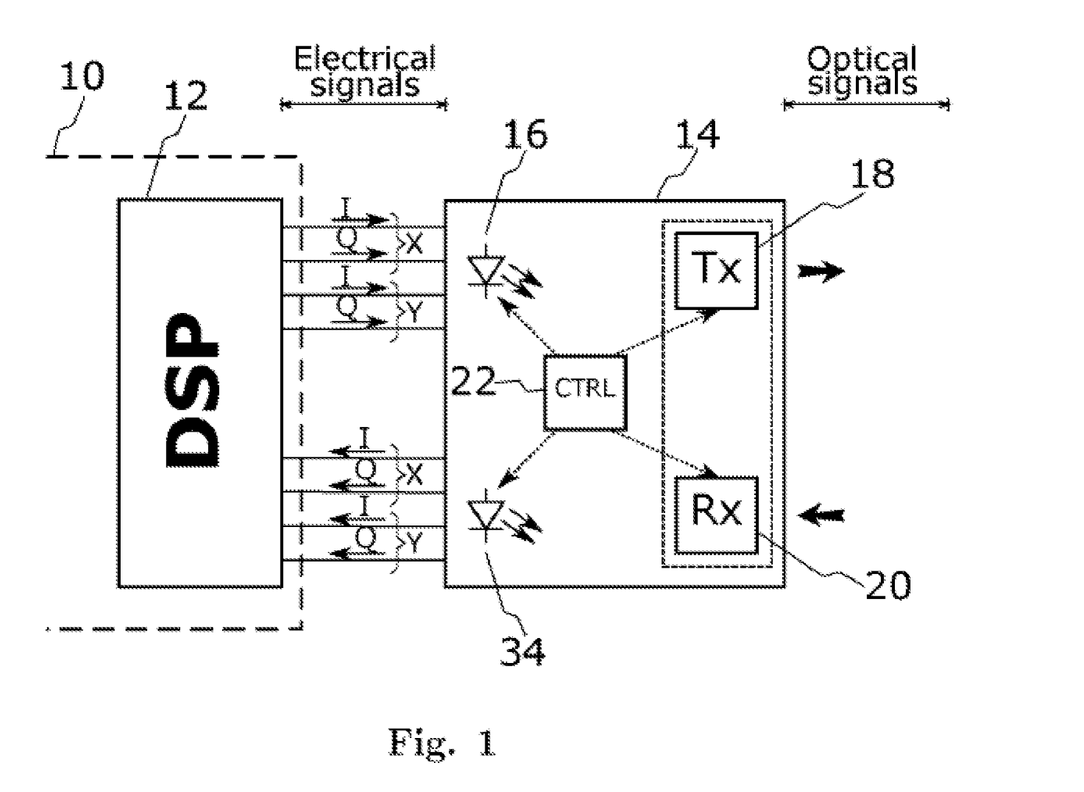
FIG. 1 is a schematic drawing representing a pluggable module and a corresponding card of a network element.

FIG. 1 schematically shows a typical configuration of a card 10 for use in a network element, said card 10 comprising a digital signal processor (DSP) 12 and a pluggable transponder module 14. All optical components are integrated in the pluggable transponder module 14. Schematically shown in FIG. 1 are two light sources 16 and 34, a transmitter 18 and a receiver 20. Light source 16 provides the optical power for the signal to be transmitted and light source 34 serves as local oscillator Furthermore, the pluggable transponder module 14 comprises a control unit 22 for setting key operating parameters of the optical components. Signals between the DSP 12 and the pluggable transponder module 14 are exchanged via electrical wires.

Figure 2:
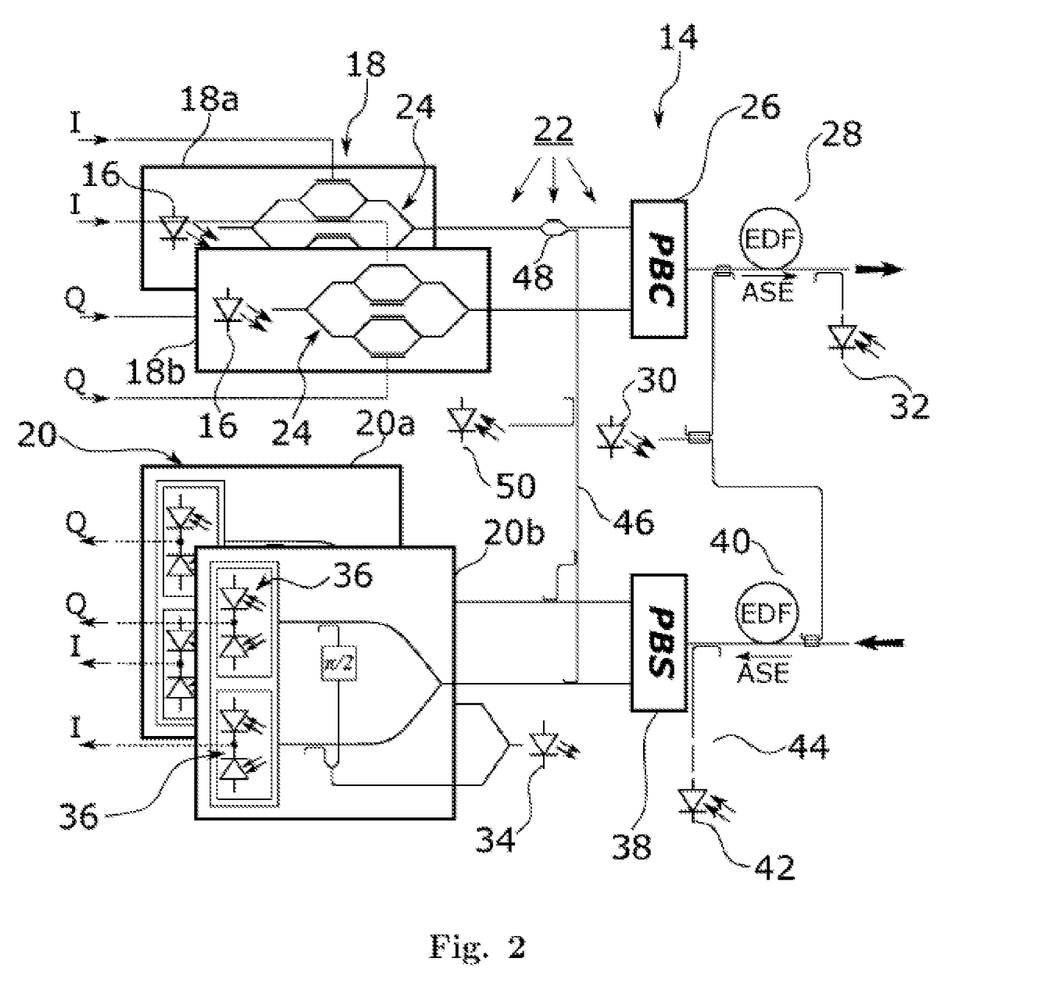
FIG. 2 is a schematic illustration of the pluggable module forming part of a transponder according to an embodiment of the present invention.

A more detailed view of a pluggable transponder module 14 according to an embodiment of the invention, referred to as "transponder 14" for brevity below, is shown in FIG. 2. As shown in FIG. 2, the transponder 14 comprises two light sources 16 and two corresponding modulators 24, which in combination form a transmitter 18. In typical implementations, the two light sources 16 will be replaced by a single light source who's output power is split by means of an optical splitter into two parts of approximately equal power that are provided to the two modulators. In the present disclosure "the transmitter 18" consists of two single polarization transmitters 18a, 18b. In the embodiment shown, the modulators 24 are dual parallel Mach-Zehnder modulators (DP-MZM). Each of the DP-MZM 24 receives a corresponding in-phase and quadrature signal (I, Q) from a DSP such as the DSP 12 shown in FIG. 1 provided on a card 10, allowing for generating a dual-polarization quadrature amplitude modulated (QAM) signal, and in particular, a QPSK signal. Both modulators 24 operate on the same polarization. Polarization multiplexing happens in a subsequent polarization beam combiner (PBC) 26. After polarization combining in the PBC 26, the final polarization multiplexed transmit signal is amplified by an erbium-doped fiber amplifier (EDFA). The EDFA 28 is pumped by means of a pumping light source 30. Downstream of the EDFA 28, a photosensitive element 32, in the shown example a photodiode, is provided for measuring the intensity of the amplified transmitted light signal for the purpose of controlling the EDFA 28. The EDFA 28 is also referred to as "transmitter output amplifier 28" herein.

The lower part of FIG. 2 shows the receiver 20 for the dual-polarization signal, comprised of two coherent single polarization receivers 20a, 20b. The single polarization receivers 20a, 20b comprise a tunable local oscillator 34, and each of them comprises two pairs of balanced photodiodes 36. Each pair of balanced photodiodes 36 is an example of the aforementioned "receiver-photodetector-assembly". In a coherent receiver, an incoming optical signal is combined with a local oscillator signal on the receiver-photodetector-assembly, such as the balanced photodiode pair 36. The intensity of the combined signal has a component having a frequency corresponding to the difference in the optical frequencies of the incoming light signal and the local oscillator 34. The output signals of the balanced photodiodes 36 resemble electrical in-phase and quadrature signals which are again designated as I and Q in the figure, and which will be processed by a suitable electronics, such as the DSP 12 of a card 10 as shown in FIG. 1. Due to the limited bandwidth of the electronics, only incoming optical signals with frequencies differing from the local oscillator frequency by less than the frequency bandwidth of the electronics can be detected, such that the coherent receiver 20a, 20b inherently acts as a wavelength filter for incoming light.

As is further seen in FIG. 2, a polarization beam splitter 38 is provided for splitting an incoming polarization multiplexed optical signal into two polarization components, each to be fed to a corresponding one of the coherent single polarization receivers 20a, 20b. A further EDFA 40 is provided, which has the primary purpose of amplifying incoming optical signals prior to receiving by the receiver 20, and is hence referred to as the "receiver input amplifier 40" herein. In the embodiment shown, the input amplifier 40 is pumped with the same pump light source 30 as the transmitter output amplifier 28. A further photosensitive element, in the shown embodiment a photodiode 42, is provided between the receiver input amplifier 40 and the "receiver photodetector assembly", i.e. the pairs of balanced photodiodes 36 of the receiver 20. While it is the primary purpose of the receiver input amplifier 40 to amplify incoming optical signals, in the framework of the present invention it is also used for generating an artificial optical noise signal by amplified spontaneous emission (ASE) for characterizing the performance of the transponder 14 in a manner described in more detail below. Since the photodiode 42 is arranged between the receiver input amplifier 40 and the receiver-photodetector-assembly (i.e. balanced photodiodes) 36, the photodiode 42 allows for determining a noise intensity value representing the intensity of the noise signal. However, for determining an OSNR, only the intensity of the noise within a small wavelength range corresponding to the bandwidth of the actual signal of interest is to be determined, which for many applications would be as narrow as 0.1 nm. Accordingly, a bandpass filter 44 is provided between the receiver input amplifier 40 and the photodiode 42 such as to only transmit the noise signal within a prescribed wavelength range. This wavelength range of the bandpass filter 44 needs not precisely correspond to the spectral width of the actual signal of interest (e.g. not exactly 0.1 nm in the above example), but in order to determine an explicit optical noise intensity value, at least the bandwidth needs to be known, such that the relevant optical noise value, or in other words, the denominator of the OSNR can be quantitatively determined. Note, however, that below an alternative embodiment will be described where precise knowledge of the bandwidth of the optical noise signal is not required. In the embodiment shown, the bandpass filter 44 is a tunable filter, which can be adapted to the wavelength of the actual signal of interest for which the OSNR or an OSNR related value is to be determined. While in FIG. 2 the transmitter output amplifier 28 and the receiver input amplifier 40 are shown to be EDFAs, it would likewise be possible to employ other optical amplifiers, such as a semiconductor optical amplifier (SOA), which would not require the pump light source 30.

As is further seen in FIG. 2, a bypass line 46 is provided, which is configured to selectively feed an optical signal from the transmitter 18 to the receiver 20. In the embodiment shown, the bypass line is connected with the output of one of the single polarization transmitters 18a only and is bifurcated to be coupled with both of the single polarization receivers 0a, 20b. In other words, the bypass line allows for redirecting test signals generated by one of the single polarization transmitters 18a, 18b to both of the single polarization receivers 20a, 20b. An optical switch 48 is provided which allows for selectively coupling light from the single polarization transmitter 18a to the bypass line 46. Herein, the optical switch 48 is resembled by a Mach-Zehnder modulator. Note that the specific configuration of the bypass line 46 is not critical. For example, it would be possible to provide for two bypass lines each connecting one of the single polarization transmitters 18a, 18b, with a corresponding one of the single polarization receivers 20a, 20b. Also, instead of a switch 48, a splitter followed by a variable attenuator can be employed. Within the bypass line 46, a further photosensitive element 50 is provided which allows for determining the intensity of a test signal conveyed via the bypass line 46. Finally, a control unit 22 is provided which controls the components of the transponder 14.

Next, the function of the transponder 14 of FIG. 2 is described. Under the control of control unit 22, in a first step, a noise signal to be received by the receiver 20 is generated by operating the receiver input amplifier 40 to thereby cause ASE in the receiver input amplifier, and to determine a noise intensity value representing the intensity of the noise signal. In the embodiment shown, "operating the receiver input amplifier 40" amounts to pumping the receiver input amplifier 40 by the pump light source 30 to thereby generate ASE resembling optical noise. Moreover, the control unit 22 determines a noise intensity value representing the intensity of the noise signal, by means of the photodiode 42. Since in the present embodiment, the transmitter output EDFA 28 and the receiver input EDFA 40 share the same pump light source 30, ASE will also be injected into the optical output of the transponder 14. However, this is not a problem as long as the ASE power is below the relevant hazard levels, because the enhanced ASE injection is carried out only during a measurement phase and not during normal operation.

In a second step, under the control of the control unit 22, a test signal is generated at the transmitter 18, and in the embodiment shown at the single polarization transmitter 18a, and a signal intensity value representing the test signal intensity is determined, based on the measurement of the photodiode 50 arranged in the bypass line 46. Herein, the ratio of the signal intensity value and the noise intensity value resembles the aforementioned OSNR related parameter. Since in the present embodiment the bandwidth of the bandpass filter 44 is precisely known, and hence the absolute value of the optical noise can be determined, the "OSNR related parameter" actually resembles the OSNR itself.

Finally, in a third step, under control of the control unit 22 the noise signal and the test signal, or replicas thereof, are superimposed to form a combined signal to be received by the receiver and a performance related parameter is determined based on the combined signal. Herein, for generating the combined signal, the test signal is fed from the transmitter 18 to the receiver 20 by means of the bypass line 46. The performance parameter may be a bit error ratio (BER), also referred to as "bit error rate" in the art, or an error vector magnitude, EVM.

Note that the order of the three steps can be interchanged as desired and the steps can even be performed in parallel if appropriate measurement devices are implemented. Moreover, these three steps are repeated several times for different injection current levels of the pump light source 30, and consequently different noise intensity values, such as to obtain a relationship between the OSNR related parameter and the performance of the transponder, thereby characterizing the noise performance of the transponder 14. As the skilled person will appreciate, this characterization of the noise performance of the transponder 14 can be carried out upon installation of the pluggable transponder modules 14 at a corresponding card in a network element, i.e. upon its commissioning. Moreover, the characterization can be carried out fully automatically under control of the control unit 22, without the need for any additional, external equipment, and does not have to be carried out by the personnel installing the pluggable transponder modules 14 in the field. Preferably, the above described steps are performed directly after plugging the module 14 into the transponder card 10. In this case, the input of the module 14 is not connected to the transmission fiber and it is guaranteed that no input signal may falsify the measurement result. However, performance measurements are also possible when the module 14 is connected to the transmission line if some measures are taken to block input light from entering the amplifier. A straight forward solution is to add an optical switch or a variable optical attenuator (VOA) directly in front of the receiver input amplifier 40 that is set to a blocking state or to high attenuation, respectively, when performing above the described steps. However, the additional losses introduced by this component may increase the noise generated by the amplifiers under normal operation and adding such a device is not always an option. Alternatively, wavelength selective switches (WSS) or optical amplifiers embedded into the transmission link and to which the respective transponder 14 is connected can also be used for blocking input light. For this purpose, the measurement phase comprising the three steps detailed above is controlled by the telecommunications network management system (TNMS). If no actions are taken for suppressing incoming signals or noise, at least a check for input light should be performed before performing the three measurement steps. Such a check can be performed by an input photodiode or by checking with the balanced photodiodes 36 if some signal is present. In case an input signal is detected, no performance measurement is possible and a message is sent to the TNMS.

The embodiment described above allows for determining the OSNR for any test signal generated by the transmitter 18. In particular, since in the described embodiment, the bandpass filter 44 is tunable to the wavelength of the test signal and has a bandwidth that is precisely known, it is possible to determine the absolute value of the optical noise at the relevant signal wavelength and within the relevant spectral range, and hence to determine an absolute OSNR value. However, providing a tunable bandpass filter with precisely known bandwidth adds to the complexity and cost of the transponder modules 14. In practice, it is difficult to avoid variations in the transfer function of an optical filter just by design. Instead, some calibration will typically be required, that adds to costs or requires additional manual intervention. In addition, the tunability of the bandpass filter further adds to the complexity and costs. In view of this, the inventors have found out that a very useful and precise transponder characterization can be carried out even when the precise bandwidth of the filter is not known, and/or when a static, i.e. not tunable bandpass filter is employed, as will be explained next.

If the bandwidth of the filter 44 is not known, only relative OSNR values (i.e. OSNR differences) can be determined for the different pump power settings, as noise and hence the denominator of the OSNR is only known up to some unknown factor. Thus, depending on the actual filter bandwidth, the procedure described above yields one of the curves shown in FIG. 3. These curves, representing the BER versus OSNR-related value for different filter bandwidths, have identical shape and differ only in a horizontal offset. A key parameter for network planning is the residual margin, which is defined as the difference between the actual OSNR and the minimum OSNR required to achieve the desired BER after FEC decoding (FEC threshold). Since the different curves are just shifted versions of the same characteristic curve, this difference can be determined without knowing the filter bandwidth.

Figure 3:
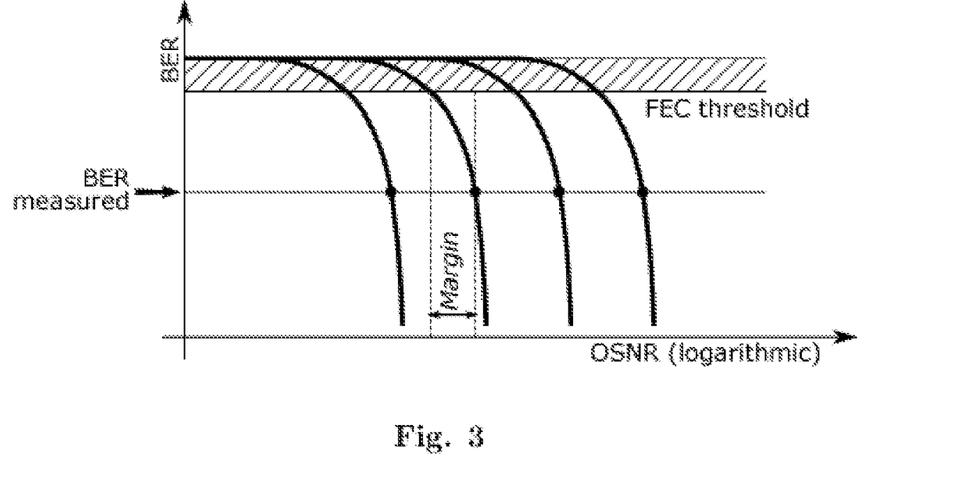
FIG. 3 shows various curves representing a bit error rate (BER) as a function of an OSNR-related parameter corresponding to the true OSNR up to an unknown factor.

Accordingly, in a preferred embodiment, the bit error rate (BER) is determined versus the OSNR based on an unknown reference bandwidth. Mathematically, this can be expressed by BER=f(X), where the variable X denotes said OSNR related value based on an unknown reference bandwidth, or in other words the true OSNR up to an unknown factor. Typically, the function f is decreasing monotonously with increasing argument X and can be inverted easily. Since the BER is determined by the transponder, the margin M can be calculated according to the equation $M=f^{-1}(BER)-f^{-1}(BER_{thr})$ where $f^{-1}$ stand for the inverse of the function f and $BER_{thr}$ represents the threshold bit error rate up to which the FEC can still correct most of the errors so that the output signal can be considered error free. Please note that the term $f^{-1}(BER_{thr})$ does not necessarily correspond to the required optical signal-to-noise ratio (OSNR) to achieve the target error rate in a back-to-back configuration.

Modern transponders are typically tunable and allow for varying the wavelength of the emitted signal. Since the ASE level needs to be known at the signal wavelength, as mentioned above, ideally the filter 44 should be tunable as well. However, since this leads to an increase in the complexity of the setup, an alternative technique involving a static filter is proposed here.

Figure 4:
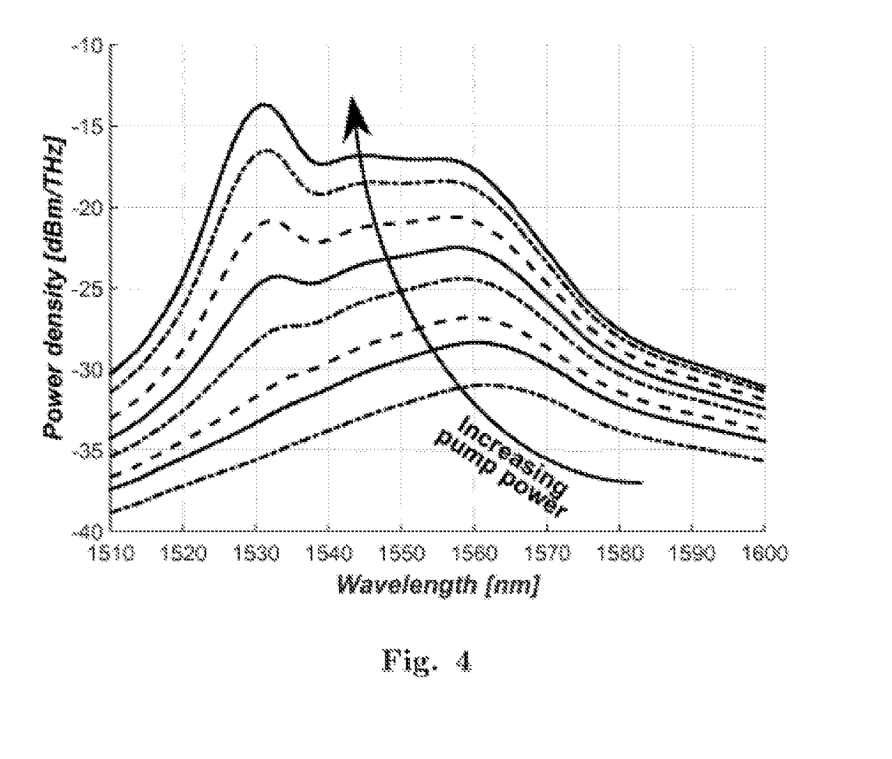
FIG. 4 shows the dependency of ASE power generated by the receiver input amplifier shown in FIG. 2 as a function of wavelength and pump power.

FIG. 4 shows ASE power densities of an EDFA as a function of wavelength, where each of the curves in FIG. 4 corresponds to a different pump power provided by the pump light source 30 shown in FIG. 2. As can be seen in FIG. 4, the ASE power density strongly depends on wavelength. Furthermore, the wavelength dependence changes with the pump power. Knowing how the ASE power generated in the receiver input amplifier 40 changes with frequency, at a given operating state thereof (such as at a given pumping power), the control unit 22 may compute the noise intensity value at the frequency of a test signal that is outside the passband of the filter 44. In particular, the corresponding information may be retrieved from a lookup table or from a calculation using a prestored function or the like.

Note that in case of a coherent receiver such as the receiver 20 shown in FIG. 2, the shape of the curves (i.e. the relative ASE power levels versus wavelength for a given operating state of the receiver input amplifier 40) can be well determined by means of the selective photodiodes 36 by sweeping the wavelength of the local oscillator 34, since the coherent receiver, as described above, inherently acts as a wavelength filter. It is actually enough to determine the value of this curve at the wavelength of interest and at the center wavelength of the optical filter and account for their ratio in estimating the ASE at the wavelength of interest. Thus, the ASE power at the wavelength of interest can be determined if the power level at the filter wavelength and the ratio of the ASE power at the two wavelengths are known.

Finally, in a particularly cost efficient embodiment, the inherent filter property of the coherent receiver 20 can be used for measuring the noise intensity value representing the intensity of the noise signal, by making use of the DSP 12 and its intrinsic frequency response. In other words, in the first step mentioned above, the ASE generated by the receiver input EDFA 40 is measured either by setting the switch 48 in the transmit path to direct the signals to the output port or, alternatively, by turning off the transmitter 18 altogether. Since no signal from the transmitter 18 reaches the monitoring photodiode and the receivers, the power measured by means of the photodiodes 36 of the receiver 20 corresponds to the ASE power within the relevant frequency range. In this embodiment, photodiode 42 would not be used for measuring the noise intensity value, and the filter 44 could be omitted completely. Moreover, it is likewise possible to omit the photodetector 50 located in the bypass line 46 and measure the signal intensity value with the photodiodes 36 of the receiver 20 as well.

The implementation of the invention has been described for a dual-polarization transponder 14 making use of phase modulation or quadrature amplitude modulation. Of course, the invention is also applicable if no polarization multiplexing is employed, or when using a single polarization only. Furthermore, the invention is independent of the actually used modulation format and is also compatible with intensity modulation.

The accuracy of the estimation of the margin can be improved by taking nonlinear fiber effects into account. In fact, the impact of nonlinear fiber effects on detection can be taken into account by adding a nonlinear interference term. For this purposes, power levels of the signal are required that may be provided by the network management system.

Figure 5:
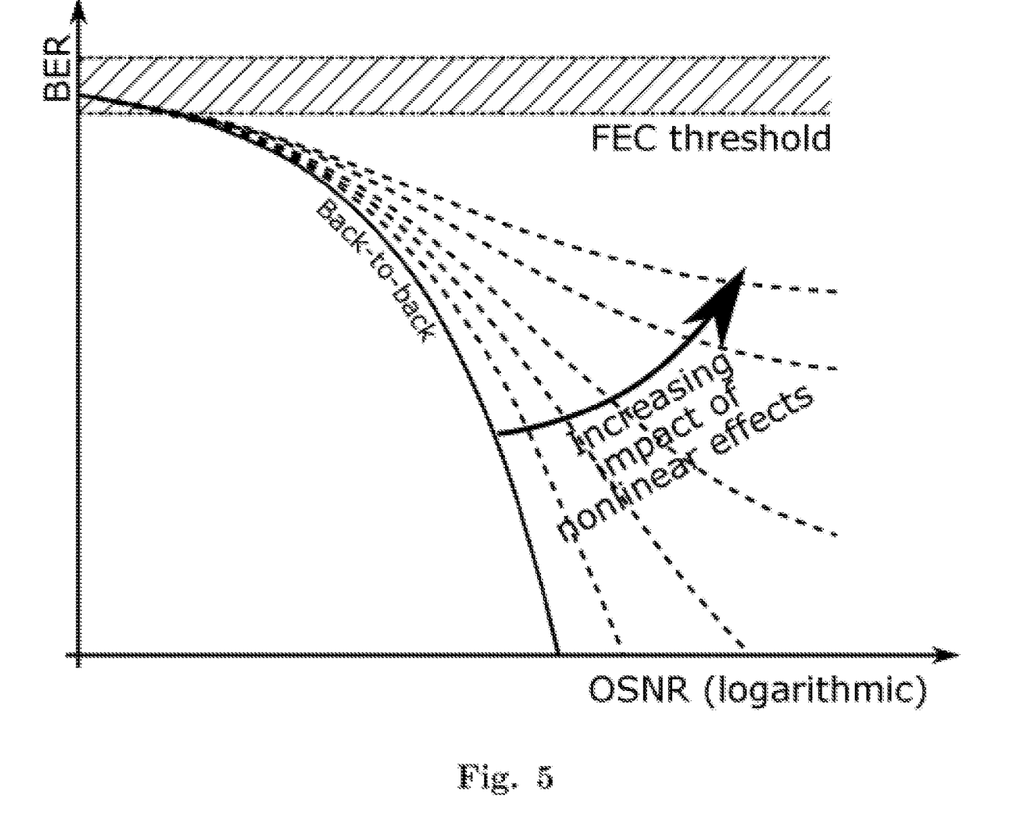
FIG. 5 shows various curves of BER versus OSNR at various signal power levels in presence of nonlinear fiber effects.
Figure 6:
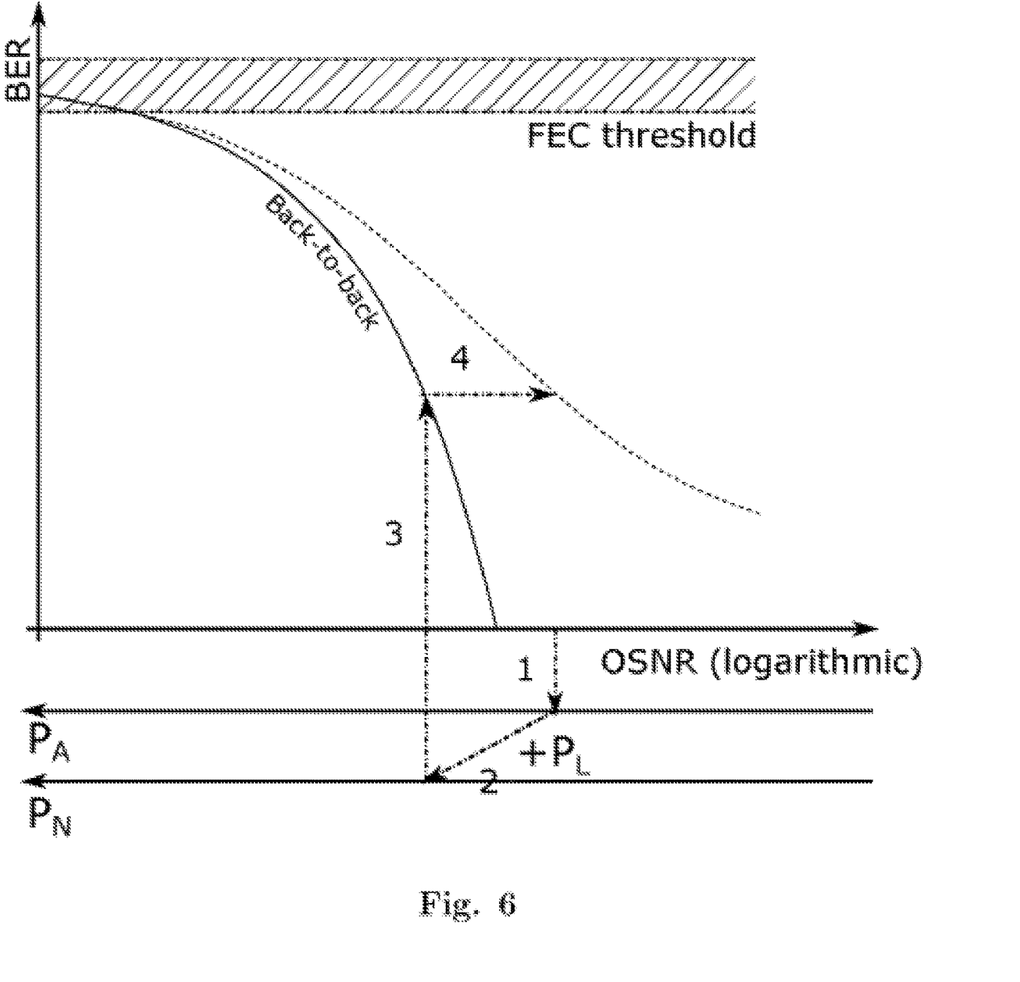
FIG. 6 is a schematic drawing explaining how the curves shown in FIG. 5 are constructed.

The various curves in FIG. 5 represent BER versus OSNR for different levels of a link-related equivalent noise power contribution which represents sources of signal degradation other than ASE that impact the signal upon transmission on the optical link. All dashed curves have been derived from the solid curve representing back-to-back performance, i.e. performance for a signal that has not been distorted by link-related effects such as nonlinear fiber effects. The construction of the dashed curves starting from the solid back-to-back curve is illustrated in FIG. 6 and will be explained later. The following approach is based on the assumption that performance degradation resulting from link-related effects can be handled like noise. Mathematically, this is taken into account by introducing an auxiliary noise power value that comprises contributions of amplified spontaneous emission (ASE) power generated on the optical link and a link-related equivalent noise power contribution representing other sources of signal degradation upon transmission on the optical link. The auxiliary noise power value hence represents a total noise power contribution resulting from the noise power contribution due to ASE and other sources of signal degradation (i.e. other than ASE) that would normally not manifest in the form of optical noise. These may for instance comprise cross-phase modulation (XPM), self phase modulation (SPM), four-wave-mixing (FWM), polarization-mode dispersion (PMD), chromatic dispersion (CD), and polarization-dependent loss (PDL) among others. Please note that most coherent receivers compensate for PMD and CD so that these effects do not affect the BER when using such receivers. Performance of the transmission system is governed by signal power and the total noise represented by the auxiliary noise power value, whereas it does not depend on the relative contributions of the different sources of performance degradation to the total equivalent noise power value.

The auxiliary noise power value may be defined as a value $P_N$ resulting from the sum of all possible sources of signal degradation, that is, of the noise power contribution due to ASE $P_A$ and an equivalent noise power contribution due to all other link-related sources of signal degradation $P_L$:

$$P_N = \Sigma P_i = P_A + P_L,$$

where Pi are all possible sources of signal degradation, including "real" optical noise power (e.g. due to ASE) and "equivalent" noise power accounting for said link-related sources of signal degradation. Thus, $P_N$ provides a measure of the optical noise power that would cause the same degree of signal degradation as the actual combination of optical noise and link-related sources of signal degradation if real optical noise was the only source of signal degradation. This relies on the assumption that all sources of signal degradation may be quantified as an equivalent noise power. The validity of this assumption for non-linear effects has been shown by P. Poggiolini in his seminal paper "The GN Model of Non-Linear Propagation in Uncompensated Coherent Optical Systems", *Journal of Lightwave Technology*. vol. 30, No. 24, Dec. 15, 2012. For other effects, such as narrowband filtering, PMD, PDL, and CD, the validity of the model has been confirmed by experiments performed by the applicant.

With reference to FIG. 5, the curve on the left represents the back-to-back curve, whereas the curves on the right of this reference represent the relation between BER and OSNR for varying extent of the nonlinear effects. The known power level of the signal is used to select the relevant curve.

For a given signal power, the noise power contribution of the ASE can be directly calculated from the OSNR. This is indicated in FIG. 6 by the additional horizontal axis displayed below the OSNR axis. Please note that the value of $P_A$ increases from the right to the left. On the assumptions detailed above, the auxiliary noise power value $P_N$ is equal to $P_A$ for the back-to-back operation and an additional axis representing $P_N$ can be drawn. When determining the BER for a given OSNR value, the corresponding ASE related noise power value $P_A$ is calculated in a first step. In step 2, the auxiliary noise power value $P_N$ is calculated from the noise power value $P_A$ and the link-related equivalent noise power $P_L$. According to the GN model, the performance of the transmission system should be identical to a configuration wherein the same auxiliary noise power value results from ASE only. Therefore, the solid back-to-back curve can be used for determining the BER by identifying the auxiliary noise power value $P_N$ with the ASE related noise power value $P_A$ on which the back-to-back curve is based in a third step. Finally, this BER is assigned in a fourth step to the OSNR value from which the calculation started. This calculation has been based on absolute noise power value. For sure, the same calculation can be also be done with noise power value normalized to the signal power.

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

LIST REFERENCE SIGNS to card of a network element
12 DSP
14 pluggable transponder module 16 transmitter light source
18 transmitter
20 receiver
22 control unit
24 dual parallel Mach-Zehnder modulator
26 polarization beam combiner
28 transmitter output amplifier
30 pump source
32 photodiode
34 local oscillator
36 pair of balanced photodiodes
38 polarization beam splitter
40 receiver input amplifier
2 photodiode
4 bandpass filter
6 bypass line
8 optical switch
50 photodiode

The invention claimed is:

1. A transponder, comprising:
a transmitter configured to transmit an optical signal to an optical communication network,
a receiver comprising a receiver photodetector assembly configured to transform into an electrical signal a received optical signal that the transponder is configured to receive from the optical communication network,
a receiver input amplifier configured to optically amplify the received optical signal prior to receipt of the received optical signal by the receiver, wherein the receiver input amplifier comprises an optical gain medium,
a bypass line configured to communicate an optical signal from the transmitter, and
a control unit configured to determine a noise performance of the transponder in relation to an OSNR-related parameter, wherein the control unit is configured to control the transponder to:
generate a noise signal by operating the receiver input amplifier to cause ASE in the receiver input amplifier,
determine a noise intensity value representing an intensity of the noise signal,
generate a test signal at the transmitter,
determine a signal intensity value representing an intensity of the test signal, wherein a ratio of the signal intensity value and the noise intensity value resembles the OSNR-related parameter,
generate a combined signal using the bypass line, the combined signal comprising one of the following:
a superimposition of the noise signal and the test signal,
a superimposition of the noise signal and a replica of the test signal,
a superimposition of the test signal and a replica of the noise signal, and
a superimposition of a replica of the noise signal and a replica of the test signal, and
determine the noise performance of the transponder based on the combined signal, wherein the noise performance of the transponder does not account for any sources of signal degradation associated with an optical link of the optical communication network to which the transponder is configured to optically connect.

2. The transponder of claim 1, wherein the receiver is a coherent receiver comprising a local oscillator configured to source light, and wherein the transponder is configured to combine the received optical signal with the light the local oscillator is configured to source.

3. The transponder of claim 1, wherein the receiver photodetector assembly comprises a pair of balanced photodiodes.

4. The transponder of claim 1, wherein at least one of the signal intensity value and the noise intensity value is determined using the receiver photodetector assembly.

5. The transponder of claim 1, wherein the transponder is configured to determine the noise intensity value using a photosensitive element arranged between the receiver input amplifier and the receiver photodetector assembly.

6. The transponder of claim 1, wherein the transponder is configured to determine the signal intensity value using a photosensitive element arranged between the transmitter and the receiver photodetector assembly.

7. The transponder of claim 1, wherein the transponder further comprises a bandpass filter configured to filter the noise signal prior to determining the noise intensity value.

8. The transponder of claim 7, wherein the bandpass filter is a static filter comprising a fixed passband, and wherein the control unit is further configured to compute the noise intensity value at a frequency of the test signal that is outside of the fixed passband, based on information relating to a change of ASE power, generated in the receiver input amplifier at a given operating state thereof, as a function of frequency.

9. The transponder of claim 8, wherein the control unit is further configured to retrieve the information from at least one of:
a lookup table,
a calculation using a prestored function.

10. The transponder of claim 8,
wherein the receiver is a coherent receiver comprising a local oscillator configured to source light,
wherein the transponder is configured to combine the optical signal with the light the local oscillator is configured to source,
wherein the control unit is further configured to obtain the information by controlling the transponder to measure:
a first intensity of the noise signal with the local oscillator tuned to a frequency of the fixed passband, and
a second intensity of the noise signal with the local oscillator tuned to the frequency of the test signal.

11. The transponder of claim 1, wherein the transponder is configured as a pluggable module that can be plugged into a card configured for use in a network element.

12. The transponder of claim 1, wherein the noise performance of the transponder is based on a performance parameter comprising at least one of:
a bit error rate, BER, and
an error vector magnitude, EVM.

13. The transponder of claim 1, wherein the control unit is further configured to:
- determine a respective noise performance of the transponder in relation to the OSNR-related parameter for each of a plurality of different noise signal intensities, and
- determine, based on a result of the determination of the respective noise performance of the transponder in relation to the OSNR-related parameter for each of the plurality of different noise signal intensities, at least one of:
  - a minimum OSNR value, at which the transponder reaches a predetermined performance threshold, and
  - an OSNR margin representing an extent to which an OSNR-related value must decrease for the transponder to reach a predetermined performance threshold.

14. The transponder of claim 13, wherein:
- the control unit is further configured to determine at least one of the minimum OSNR value and the OSNR margin, based on:
  - the result of the determination of the respective noise performance of the transponder in relation to the OSNR-related parameter for each of the plurality of different noise signal intensities, and
  - information about an optical link to which the transponder is configured to communicatively connect,
- the transponder is configured based at least in part on the determined at least one of the minimum OSNR value and the OSNR margin.

15. The transponder of claim 13, wherein the plurality of different noise signal intensities result at least in part by varying a pump power of the receiver input amplifier.

16. The transponder of claim 1, wherein to selectively feed the optical signal from the transmitter that the bypass line is configured to communicate, the transponder further comprises at least one of:
- an optical switch,
- a splitter in combination with at least one optical attenuator.

17. The transponder of claim 1, wherein:
- the transponder is a dual-polarization transponder configured to:
  - transmit a polarization-multiplexed signal that comprises one of a QPSK and a QAM signal, and
  - receive a polarization-multiplexed signal that comprises one of a QPSK and a QAM signal,
- the transmitter comprises two IQ modulators, each one of the two IQ modulators being communicatively connected to a polarization beam combiner, and
- the receiver comprises two IQ receiver units, each one of the two IQ receiver units being communicatively connected to a polarization beam splitter.

18. The transponder of claim 17, wherein the bypass line is communicatively connected to:
- an output of only one of the two IQ modulators, and
- both of the two IQ receiver units.

19. The transponder of claim 1, wherein the control unit is configured to carry out the determining of the noise performance of the transponder in relation to the OSNR-related parameter automatically upon at least one of:
- a first field installation of the transponder,
- a trigger signal received from a network management system.

20. A method of measuring a noise performance of a transponder, the transponder comprising:
- a transmitter configured to transmit an optical signal to an optical communication network,
- a receiver comprising a receiver photodetector assembly configured to transform into an electrical signal a received optical signal that the transponder is configured to receive from the optical communication network,
- a receiver input amplifier configured to optically amplify the received optical signal prior to receipt of the received optical signal by the receiver, wherein the receiver input amplifier comprises an optical gain medium,
- a bypass line configured to communicate an optical signal from the transmitter, the method comprising the steps of:
- generating a noise signal by controlling the transponder to operate the receiver input amplifier to cause ASE in the receiver input amplifier,
- determining a noise intensity value representing an intensity of the noise signal,
- generating a test signal at the transmitter,
- determining a signal intensity value representing an intensity of the test signal, wherein a ratio of the signal intensity value and the noise intensity value resembles the OSNR-related parameter,
- generating a combined signal using the bypass line, the combined signal comprising one of the following:
  - a superimposition of the noise signal and the test signal,
  - a superimposition of the noise signal and a replica of the test signal,
  - a superimposition of the test signal and a replica of the noise signal, and
  - a superimposition of a replica of the noise signal and a replica of the test signal, and
- determining the noise performance of the transponder based on the combined signal, wherein the noise performance of the transponder does not account for any sources of signal degradation associated with an optical link of the optical communication network to which the transponder is configured to optically connect.

21. The method of claim 20, wherein the receiver is a coherent receiver comprising a local oscillator configured to source light, and wherein the transponder is configured to combine the received optical signal with the light the local oscillator is configured to source.

22. The method of claim 20, wherein the receiver photodetector assembly comprises a pair of balanced photodiodes.

23. The method of claim 20, wherein at least one of the signal intensity value and the noise intensity value is determined using the receiver photodetector assembly.

24. The method of claim 20, wherein the noise intensity value is determined using a photosensitive element arranged between the receiver input amplifier and the receiver photodetector assembly.

25. The method of claim 20, wherein the signal intensity value is determined using a photosensitive element arranged between the transmitter and the receiver photodetector assembly.

26. The method of claim 20, wherein prior to determining the noise intensity value the noise signal is filtered using a bandpass filter selected from a group consisting of a tunable bandpass filter and a static bandpass filter having a fixed passband, and wherein:
- if the selected bandpass filter is the tunable bandpass filter, then the method further comprises a step of adjusting a frequency of a passband of the tunable bandpass filter to a frequency of the test signal, if alternatively the selected bandpass filter is instead the static bandpass filter having a fixed passband, then the method further comprises a step of computing the noise intensity value at a frequency of the test signal that is outside of the fixed passband based on information relating to a change of ASE power, generated in the receiver input amplifier at a given operating state thereof, as a function of frequency.

27. The method of claim 26, wherein if the selected bandpass filter is the static bandpass filter, then the information is retrieved from at least one of:
a lookup table,
a calculation using a prestored function.

28. The method of claim 26, wherein:
the receiver is a coherent receiver comprising a local oscillator configured to source light,
the transponder is configured to combine the received optical signal with the light the local oscillator is configured to source,
if the selected bandpass filter is the static bandpass filter, then the information is obtained by measuring:
a first intensity of the noise signal with the local oscillator tuned to a frequency of the fixed passband, and
a second intensity of the noise signal with the local oscillator tuned to the frequency of the test signal.

29. The method of claim 20, wherein the transponder is configured as a pluggable module that can be plugged into a card configured for use in a network element.

30. The method of claim 20, wherein the noise performance of the transponder is based on a performance parameter comprising at least one of:
a bit error rate, BER, and
an error vector magnitude, EVM.

31. The method of claim 20, wherein a respective noise performance of the transponder is determined for each of a plurality of different noise signal intensities, and based on a result of the determination of the respective noise performance of the transponder in relation to the OSNR-related parameter for each of the plurality of different noise signal intensities, the method comprises a determination of at least one of:
a minimum OSNR value, at which the transponder reaches a predetermined performance threshold, and
an OSNR margin representing an extent to which an OSNR-related value must decrease for the transponder to reach a predetermined performance threshold.

32. The method of claim 31, wherein:
the step of determining at least one of the minimum OSNR value and the OSNR margin is carried out based on:
the result of the determination of the respective noise performance of the transponder in relation to the OSNR-related parameter for each of the plurality of different noise signal intensities, and
information about an optical link to which the transponder is configured to communicatively connect,
the method accounts at least in part for sources of signal degradation other than ASE upon transmission on the optical link.

33. The method of claim 31, wherein the plurality of different noise signal intensities result at least in part by varying an operational state of the receiver input amplifier.

34. The method of claim 20, wherein the noise performance of the transponder in relation to the OSNR-related parameter is carried out automatically upon at least one of:
a first field installation of the transponder,
a trigger signal received from a network management system.

* * * * *